(12) United States Patent
Miu et al.

(10) Patent No.: US 11,885,987 B2
(45) Date of Patent: *Jan. 30, 2024

(54) QUANTUM-DOT FILM AND THE METHOD TO MAKE THE SAME

(71) Applicant: UBRIGHT OPTRONICS CORPORATION, Taoyuan (TW)

(72) Inventors: Chia-Yeh Miu, Taoyuan (TW); Ge-Wei Lin, Taoyuan (TW); Chia-Jung Chiang, Taoyuan (TW); Chien-Chih Lai, Taoyuan (TW); Lung-Pin Hsin, Taoyuan (TW); Yi-Long Tyan, Taoyuan (TW); Jeffrey Wu, Taoyuan (TW); Hui-Yong Chen, Taoyuan (TW); Ying-Yi Lu, Taoyuan (TW)

(73) Assignee: UBRIGHT OPTRONICS CORPORATION, Taoyuan (TW)

( * ) Notice: Subject to any disclaimer, the term of this patent is extended or adjusted under 35 U.S.C. 154(b) by 193 days.

This patent is subject to a terminal disclaimer.

(21) Appl. No.: 17/078,078

(22) Filed: Oct. 22, 2020

(65) Prior Publication Data
US 2021/0122972 A1 Apr. 29, 2021

Related U.S. Application Data

(60) Provisional application No. 62/925,234, filed on Oct. 24, 2019.

(51) Int. Cl.
*G02B 5/02* (2006.01)
*G02B 5/04* (2006.01)
(Continued)

(52) U.S. Cl.
CPC ............ *G02B 5/0242* (2013.01); *B29B 15/10* (2013.01); *B29C 48/0018* (2019.02); *B29C 48/16* (2019.02); *C08L 67/02* (2013.01); *C09K 11/02* (2013.01); *G02B 5/045* (2013.01); *G02F 1/01791* (2021.01); *B29K 2067/003* (2013.01); *B29K 2995/0018* (2013.01);
(Continued)

(58) Field of Classification Search
CPC ......... C09K 11/02; B82Y 20/00; B82Y 30/00; B82Y 40/00; B29K 2067/003; C08L 2203/16; C08L 67/02
See application file for complete search history.

(56) References Cited

U.S. PATENT DOCUMENTS

2008/0041542 A1* 2/2008 Gray ..................... C08L 1/10
428/326
2009/0162011 A1* 6/2009 Coe-Sullivan ....... G02B 6/0011
252/582

(Continued)

FOREIGN PATENT DOCUMENTS

CN 109535665 * 3/2019
EP 3514615 * 7/2019
(Continued)

*Primary Examiner* — C Melissa Koslow
(74) *Attorney, Agent, or Firm* — Min-Lee Teng

(57) ABSTRACT

The present invention discloses a quantum-dot film, wherein the quantum-dot film comprises a binder and a plurality of quantum dots dispersed in the binder, wherein the plurality of quantum dots are capable of being water-resistant and oxygen-resistant.

10 Claims, 4 Drawing Sheets

(51) Int. Cl.
    *B29C 48/16*     (2019.01)
    *B29C 48/00*     (2019.01)
    *G02F 1/017*     (2006.01)
    *B29B 15/10*     (2006.01)
    *C08L 67/02*     (2006.01)
    *C09K 11/02*     (2006.01)
    *B29K 67/00*     (2006.01)
    *B82Y 20/00*     (2011.01)
    *B82Y 30/00*     (2011.01)
    *B82Y 40/00*     (2011.01)

(52) U.S. Cl.
    CPC ....... *B29K 2995/0053* (2013.01); *B82Y 20/00* (2013.01); *B82Y 30/00* (2013.01); *B82Y 40/00* (2013.01); *C08L 2203/16* (2013.01); *G02B 2207/113* (2013.01)

(56) References Cited

U.S. PATENT DOCUMENTS

| | | | | |
|---|---|---|---|---|
| 2013/0075692 | A1* | 3/2013 | Naasani | H01L 33/501 |
| | | | | 257/E33.059 |
| 2015/0260373 | A1* | 9/2015 | Li | C09K 11/70 |
| | | | | 156/325 |
| 2016/0025918 | A1* | 1/2016 | Lee | G02B 6/0051 |
| | | | | 362/601 |
| 2019/0044034 | A1* | 2/2019 | Hyun | H01L 33/502 |
| 2021/0189230 | A1* | 6/2021 | Iida | B32B 27/36 |

FOREIGN PATENT DOCUMENTS

| | | | |
|---|---|---|---|
| JP | 2016-114846 | * | 6/2016 |
| WO | WO 2019/078135 | * | 4/2019 |

\* cited by examiner

QUANTUM-DOT FILM AND THE METHOD TO MAKE THE SAME

CROSS-REFERENCE TO RELATED APPLICATION

This application claims the benefit of U.S. provisional patent application No. 62/925,234, filed on Oct. 24, 2019, which is hereby incorporated herein by reference.

BACKGROUND OF THE INVENTION

1. Field of the Invention

The present invention relates to an optical film, and more particularly to a quantum-dot optical film.

2. Description of Related Art

The quantum dot is a semiconductor particle having a nanometer size and a spherical shape. The colored spectrum can be generated when the quantum dots are excited by light or electricity. The color of the excited light is determined according to the material and the size of the quantum dot. Because quantum dots can change the color of the light emitted by a light source, they can be widely used in display devices, such as liquid crystal displays (LCD). The quantum dots can enhance the color gamut, the color and the brightness of the display device such that the display device can have a color gamut of about 110% NTSC (National Television System Committee).

The quantum dot is commonly made of IV, II-VI, IV-VI or III-V elements, such as Si, Ge, CdS, CdSe, CdTe, ZnSe, PbS, PbSe, InP and InAs, where the most widely used are mainly CdSe and InP. QD Vision mainly uses CdSe as the material of the quantum dot, Nanoco mainly uses InP as the material of the quantum dot and Nanosys uses a combination of CdSe and InP as the material of the quantum dot.

The features of the quantum dots used in display devices include: (1) high color pureness and the peak shown in the spectrum is narrower and symmetrically distributed; (2) controlling the size and the material of the quantum dot can change the wavelength of the emission light to further adjust the color of the light, which can be shown in the emission spectrum; (3) better performance in the color with color gamut greater than 110% NTSC; (4) quantum efficiency of at least 90%, so light stability is good; (5) potentially achieving pixels of a nanometer-class, and as such, quantum dots can be used for manufacturing a screen of the highest resolution.

However, the conventional manufacturing complexity of a quantum-dot film is complicated and the total thickness of a quantum-dot film is too large.

Accordingly, the present invention proposes a new solution to overcome the above-mentioned disadvantages.

SUMMARY OF THE INVENTION

The present invention disclose a quantum-dot film, wherein the quantum-dot film comprises a binder and a plurality of quantum dots dispersed in the binder, wherein the quantum dots are capable of being water-resistant and oxygen-resistant enough without a barrier layer formed over the quantum-dot film in order to simplify manufacturing complexity of the quantum-dot film and to reduce the total thickness of the quantum-dot film.

In one embodiment, the present invention discloses a quantum-dot film comprising: a quantum-dot layer comprising a binder and a plurality of quantum dots dispersed in the binder, wherein the plurality of quantum dots are capable of being water-resistant and oxygen-resistant.

In one embodiment, there is no barrier layer disposed over the quantum-dot layer for preventing the plurality of quantum dots from water or oxygen.

In one embodiment, the quantum-dot layer further comprises a plurality of diffusing particles.

In one embodiment, the quantum dots comprises Cd.

In one embodiment, the concentration of the Cd in a quantum dot is 0.1-10%.

In one embodiment, the concentration of the Cd in a quantum dot is 0.3-2%.

In one embodiment, the thickness of the quantum-dot film is 25-350 pin.

In one embodiment, the binder is at least of the following: PET (polyethylene terephthalate), PEN (polyethylene naphtholate), PAR (polyacrylate), PC (polycarbonates) or TAC (cellulose triacetate).

In one embodiment, the quantum-dot layer has a first major surface and a second major surface opposite to the first major surface, wherein each of the first major surface and the second major surface of the quantum-dot layer comprises a structured surface.

In one embodiment, the present invention discloses an optical film comprising: a plurality of quantum dots dispersed therein, wherein the plurality of quantum dots are capable of being water-resistant and oxygen-resistant.

In one embodiment, the optical film further comprises a plurality of diffusing particles.

In one embodiment, the present invention discloses a method for forming a quantum-dot film, comprising: performing a process on the plurality of quantum dots for enabling the plurality of quantum dots to be water-resistant and oxygen-resistant; and forming a quantum-dot layer comprising a binder and a plurality of quantum dots dispersed in the binder, wherein the plurality of quantum dots are capable of being water-resistant and oxygen-resistant.

In one embodiment, the binder is made of PET (polyethylene terephthalate) material, wherein the plurality of quantum dots are dispersed into the PET material by a micro-twin screw extruder nano-dispersion processing technology.

In one embodiment, the method further comprising using a co-extrusion and biaxial stretching technology to form a PET quantum-dot optical-film.

The detailed technology and above preferred embodiments implemented for the present invention are described in the following paragraphs accompanying the appended drawings for people skilled in this field to well appreciate the features of the claimed invention.

BRIEF DESCRIPTION OF THE DRAWINGS

The foregoing aspects and many of the accompanying advantages of this invention will become more readily appreciated as the same becomes better understood by reference to the following detailed description when taken in conjunction with the accompanying drawings, wherein.

DETAILED DESCRIPTION OF THE ILLUSTRATED EMBODIMENTS

The detailed explanation of the present invention is described as following. The described preferred embodiments are presented for purposes of illustrations and description and they are not intended to limit the scope of the present invention.

Figure 1:
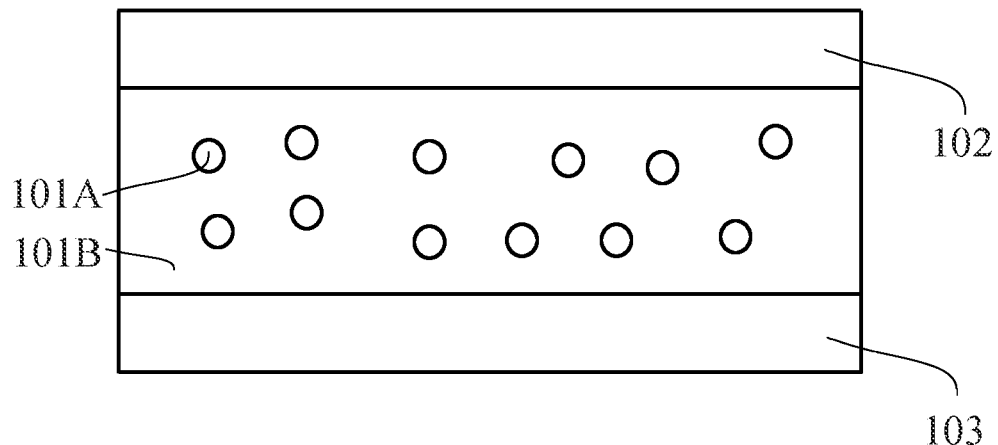
FIG. 1 illustrates a schematic cross-sectional view of a quantum-dot film.

The quantum dots in the quantum-dot film are highly sensitive to degradation, so the quantum dot-film should have excellent barrier properties to prevent damage to the quantum dots in the quantum-dot film caused by oxygen or water, which degrades the performance of the quantum-dot film. Conventionally, see FIG. 1, the quantum-dot film 100 includes a first barrier layer 102, a second barrier layer 103 and a binder 101B between the first barrier layer 102 and the second barrier layer 103. A plurality of quantum dots 101A are dispersed in the binder 101B. The barrier layers 102, 103 can protect the quantum dots 101A from damage caused by oxygen or water.

However, the barrier layers 102, 103 will increase the total thickness and the manufacturing complexity of the quantum-dot film 100.

Figure 2:
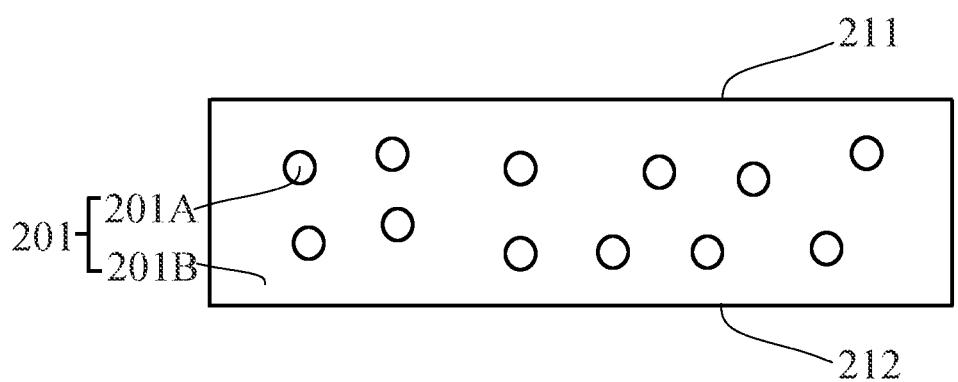
FIG. 2 illustrates a schematic cross-sectional view of the quantum-dot film in the present invention.

FIG. 2 illustrates a schematic cross-sectional view of the quantum-dot film 200 in the present invention. The quantum-dot film 200 comprises a quantum-dot layer 201. The quantum-dot layer 201 comprises a binder 201B and a plurality of quantum dots 201A dispersed in the binder 201B. The thickness of the quantum-dot layer 201 can be in the range from 25 µm to 350 µm. The quantum-dot layer 201 has a first major surface 211 and a second major surface 212 opposite to the first major surface 211.

The quantum dots 201A have a high stability when exposed to high temperature or heat, so the surface of the quantum dots 201A can be specially treated to improve the ability of resisting environmental damage caused by water and oxygen; therefore, the quantum dots 201A are capable of being water-resistant and oxygen-resistant enough without a barrier layer formed over/on each of the first major surface 211 and the second major surface 212 of the quantum-dot layer 201.

The quantum-dot layer 201 is capable of being supported by itself without a supporting layer formed over each of the first major surface 211 and the second major surface 212 of the quantum-dot layer 201. Therefore, the material of the binder 201B of the quantum-dot layer 201 should be selected such that the quantum-dot layer 201 is capable of being supported by itself without a supporting layer formed over each of the first major surface 211 and the second major surface 212 of the quantum-dot layer 201. In addition, the material of the binder 201B of the quantum-dot layer 201 should be selected such that the quantum dots 201A in the quantum-dot film 200 is protected from damage caused by oxygen or water. The material of the binder 201B can include at least one of the following: PET (polyethylene terephthalate), PEN (polyethylene naphtholate), PAR (polyacrylate), PC (polycarbonates) and TAC (cellulose triacetate). Preferably, the material is PET (polyethylene terephthalate). The material can be pure PET (polyethylene terephthalate). The material of the binder 201B can be unitary or homogeneous.

The quantum dots 201A can comprise green quantum dots and red quantum dots. The material of the quantum dots 201A can comprise CdS, CdSe, CdTe, ZnSe, PbS, PbSe, InP, InAs, InGaP, ZnS or ZnTe, but the present invention is not limited thereto. The material of the quantum dots 201A can comprise Cd (e.g., CdSe) or be Cd-free (e.g., InP). The concentration of the quantum dots 201A can be in the range from 0.05 to 20%, preferably, from 0.3 to 8%.

In one embodiment, the concentration of the quantum dots 201A in the quantum-dot layer 201 is 0.05-20%.

In one embodiment, the concentration of the quantum dots 201A in the quantum-dot layer 201 is 0.05-8%.

In one embodiment, the thickness of the quantum-dot film is 25-350 µm.

Optionally, the quantum-dot film 200 can comprise a plurality of diffusing particles (not shown); the diffusing particles are further provided to increase the uniformity of the quantum dots 201A dispersed in the binder 201B. The material of the diffusing particles can be organic (e.g., PMMA (polymethyl methacrylate), PS (polystyrene), Melamine) or inorganic (e.g., silicon, $SiO_2$, $TiO_2$, $CaCO_3$, $Al_2O_3$, $ZrO_2$). The concentration of the diffusing particles can be in the range from 2 to 40%, preferably, from 5 to 15%.

Figure 3:
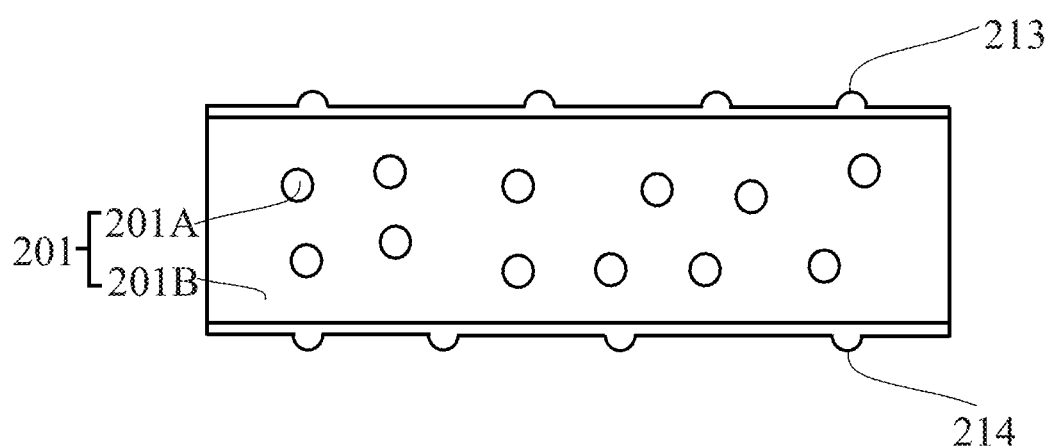
FIG. 3 illustrates a schematic cross-sectional view of the quantum-dot film in the present invention, wherein each of the first major surface and the second major surface of the quantum-dot layer is a structured surface.

Each of the first major surface 211 and the second major surface 212 of the quantum-dot layer 201 can be a structured surface 213, 214 (see the quantum-dot film 250 in FIG. 3). The structured surface 213, 214 can be used for reducing the undesired photo phenomenon, such as Newton's rings. The matt structure can be used to forming each of the first major surface 211 and the second major surface 212 of the quantum-dot layer 201.

The manufacturing method for forming the quantum-dot film 200 is described as follows.

The method for forming a quantum-dot film 200 comprises forming a quantum-dot layer 201 comprising a binder 201B and a plurality of quantum dots 201A dispersed in the binder 201B. Forming the quantum-dot layer 201 comprises performing a process on the quantum dots 201A and the material such that the plurality of quantum dots 201A is dispersed in the binder 201B. The process can be a co-extrusion process.

Embodiment A1

The material of the binder 201B can comprise a first portion and a second portion, wherein the quantum dots 201A and the first portion of the material are combined into a first component and the second portion of the material is formed into a second component, wherein the process is performed on the first component and the second component such that the quantum dots 201A are dispersed in the binder 201B. The process can be a co-extrusion process.

For convenience of explanation, the material of the binder 201B is PET in Embodiment A1 of the invention; however, the present invention is not limited to this case. After the quantum dots 201A are uniformly dispersed by a dispersion process, the quantum dots 201A and a first portion of PET can be combined into a first component (e.g., by the twin screw extruder or the micro-twin screw extruder). The first component (i.e. QD in PET) can be in the form of a plurality of first chips. The first component may have a high concentration of the quantum dots 201A. The first component may have a better light-emitting effect and a better light-emitting uniformity. The second component can be made of pure PET or have a high concentration of PET. The second component (i.e. PET) can be in the form of a plurality of second chips (i.e. PET chips). The first component and the second component can be formed into the quantum-dot film 200 in the present invention based on a suitable mass ratio thereof (e.g., by the co-extrusion process).

The first component and the second component can be combined into a composite mixture (e.g., by the twin screw extruder or the micro-twin screw extruder), wherein the process is performed on the composite mixture such that the quantum dots 201A are dispersed in the binder 201B. The composite mixture may have a better light-emitting effect and a better light-emitting uniformity. The process can be a co-extrusion process.

Embodiment A2

The material of the binder 201B can comprise a first portion, a second portion and a third portion, wherein the quantum dots 201A and the first portion of the material are combined into a first component, the second portion of the material is formed into a second component, and the diffusing particles and the third portion of the material are combined into a third component, wherein the process is performed on the on the first component, the second component and the third component such that the quantum dots 201A are uniformly dispersed in the binder 201B. The process can be a co-extrusion process.

For convenience of explanation, the material of the binder 201B is PET in Embodiment A2 of the invention; however, the present invention is not limited to this case. Compared to Embodiment A1 in which the first component and the second component are provided, Embodiment A2 further comprises a third component. After the diffusing particles are uniformly dispersed by a dispersion process, the diffusing particles and a third portion of PET can be combined into a third component (e.g., by the twin screw extruder or the micro-twin screw extruder). The third component (i.e. diffusing particles in PET) can be in the form of a plurality of third chips. The third component may have a high concentration of the diffusing particles. The first component, the second component and the third component can be formed into the quantum-dot film 200 in the present invention based on a suitable mass ratio thereof (e.g., by the co-extrusion process).

The first component, the second component and the third component are combined into a composite mixture (e.g., by the twin screw extruder or the micro-twin screw extruder), wherein the process is performed on the composite mixture such that the quantum dots 201A are uniformly dispersed in the binder 201B. The composite mixture may have a better light-emitting effect and a better light-emitting uniformity. The process can be a co-extrusion process.

The quantum dots 201A can comprise green quantum dots and red quantum dots. The green quantum dots and a portion of PET can be combined into a first sub-component (e.g., by the twin screw extruder or the micro-twin screw extruder). The red quantum dots and another portion of PET can be combined into a second sub-component (e.g., by the twin screw extruder or the micro-twin screw extruder). The first sub-component and the second sub-component can be regarded as the first component in each of Embodiment A1 and Embodiment A2.

The process can be a co-extrusion process which is one of the stretch-forming technologies used for film-forming. The stretch-forming technology can be a bi-axially stretch-forming technology. The co-extrusion is a process in which two or more plastic materials, each of which has a property $X_i$, are extruded and combined to form a structure having a combination of the properties $X_1, X_2, \ldots X_N$ (N is integer and larger than 1) of the two or more plastic materials. When performing the co-extrusion process by using two plastic materials in Embodiment A1, one plastic material can be the first component and the other plastic material can be the second component. When performing the co-extrusion process by using three materials in Embodiment A2, one plastic material can be the first component, another material can be the second component and the other plastic material can be the third component.

Embodiment A2 is further described in detail.

For convenience of explanation, the material of the binder 201B is PET and the material of the diffusing particles is PMMA in further described Embodiment A2 of the invention; however, the present invention is not limited to this case. Place PET chips in the oven and dry PET chips at 100° C. for 24 hours. Place PMMA beads in the oven and dry PMMA beads at 100° C. for 24 hours. Prepare the first mixture having the green quantum dots and the PET chips. The mass of the green quantum dots is 8 g and the mass of the PET chips is 72 g. Pre-uniform the first mixture and place the first mixture in the twin screw extruder (or the micro-twin screw extruder, or the micro-extruder). Perform a heat dispersion (or nano-dispersion) process on the first mixture at 280° C. in the twin screw extruder (by the high shear force) for 10 minutes to form the first sub-component (i.e. GQD in PET). The first sub-component may have a high concentration of the green quantum dots. Prepare the second mixture having the red quantum dots and the PET chips. The mass of the red quantum dots is 20 g and the mass of the PET chips is 72 g. Pre-uniform the second mixture and place the second mixture in the twin screw extruder (or the micro-twin screw extruder, or the micro-extruder). Perform a heat dispersion (or nano-dispersion) process on the second mixture at 280° C. in the twin screw extruder (by the high shear force) for 10 minutes to form the second sub-component (i.e. RQD in PET). The second sub-component may have a high concentration of the red quantum dots. The first sub-component and the second sub-component can be regarded as the first component in Embodiment A2. Prepare the third mixture having the PMMA beads and the PET chips. The mass of the PMMA beads is 32 g and the mass of the PET chips is 48 g. Pre-uniform the third mixture and place the third mixture in the twin screw extruder (or the micro-twin screw extruder, or the micro-extruder). Perform a heat dispersion (or nano-dispersion) process on the third mixture at 280° C. in the twin screw extruder (by the high shear force) for 10 minutes to form the third component (i.e. PMMA in PET). Prepare the fourth mixture having the first sub-component (i.e. GQD in PET), the second sub-component (i.e. RQD in PET), the third component (i.e. PMMA in PET) and the second component (i.e. PET chips). The mass of the first sub-component is 13 g, the mass of the second sub-component is 6 g, the mass of the third component is 16 g and the second component is 30 g. Place the fourth mixture in the twin screw extruder (or the micro-twin screw extruder, or the micro-extruder). Perform a heat dispersion (or nano-dispersion) process on the fourth mixture at 280° C. in the twin screw extruder (by the high shear force) for 10 minutes to form the composite mixture. Finally, the composite mixture is formed into a quantum-dot film 200 (by the hot plate).

In one embodiment, the plurality of quantum dots are dispersed into the spaces between particles of the PET by a micro-twin screw extruder nano-dispersion processing technology.

In one embodiment, a PET co-extrusion and biaxial stretching technology is used to form a PET quantum-dot optical-film. The PET quantum-dot optical-film does not need to have an additional gas barrier film (gas barrier film) and can still achieve a same anti-environmental test level.

Figure 4:
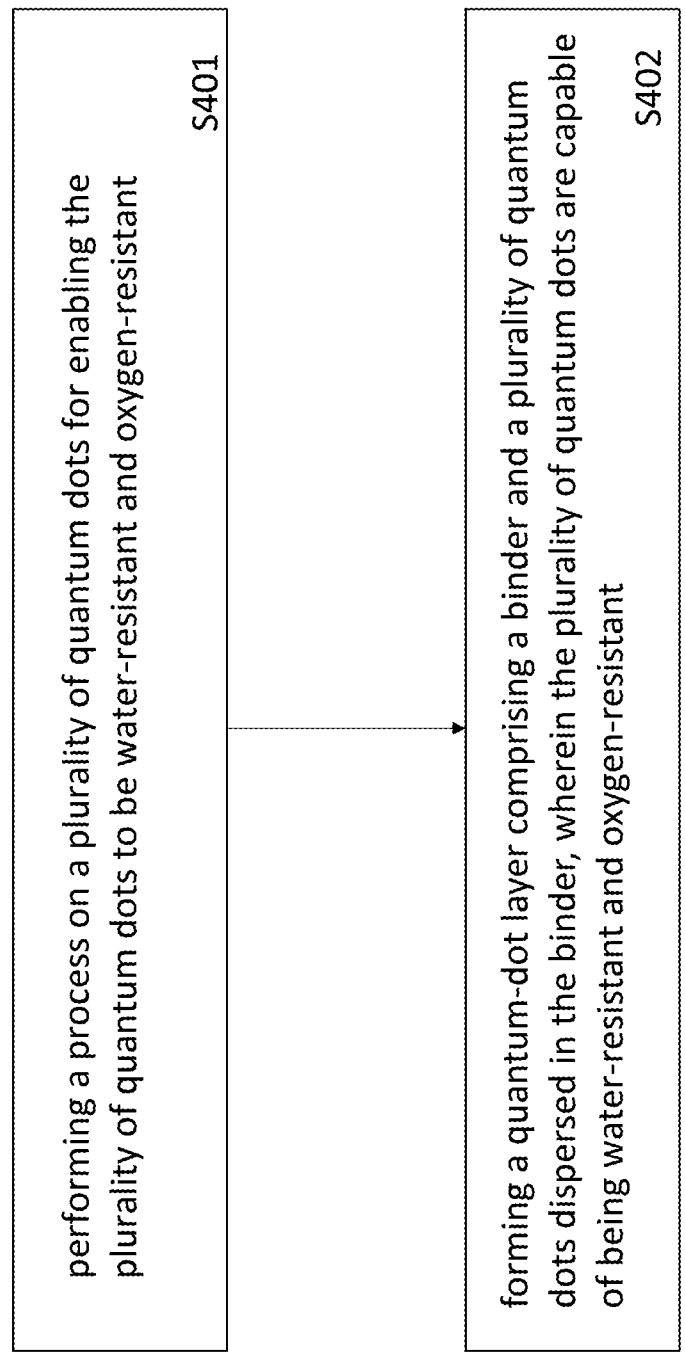
FIG. 4 illustrates a method for forming a quantum-dot film.

FIG. 4 illustrates a method for forming a quantum-dot film, in step S401: performing a process on the plurality of quantum dots for enabling the plurality of quantum dots to be water-resistant and oxygen-resistant; and in step S402: forming a quantum-dot layer comprising a binder and a plurality of quantum dots dispersed in the binder, wherein the plurality of quantum dots are capable of being water-resistant and oxygen-resistant.

Figure 5A:
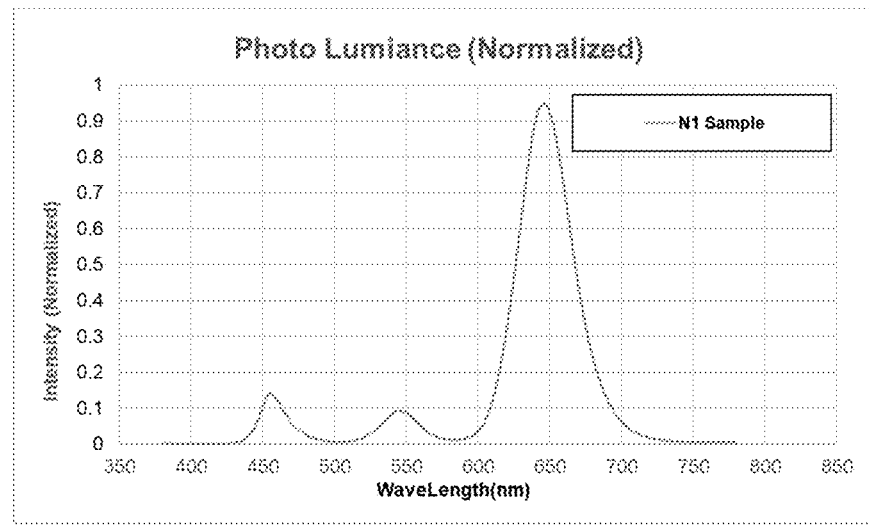
FIG. 5A illustrates the photo-luminance performance of the quantum-dot film in the present invention.
Figure 5B:
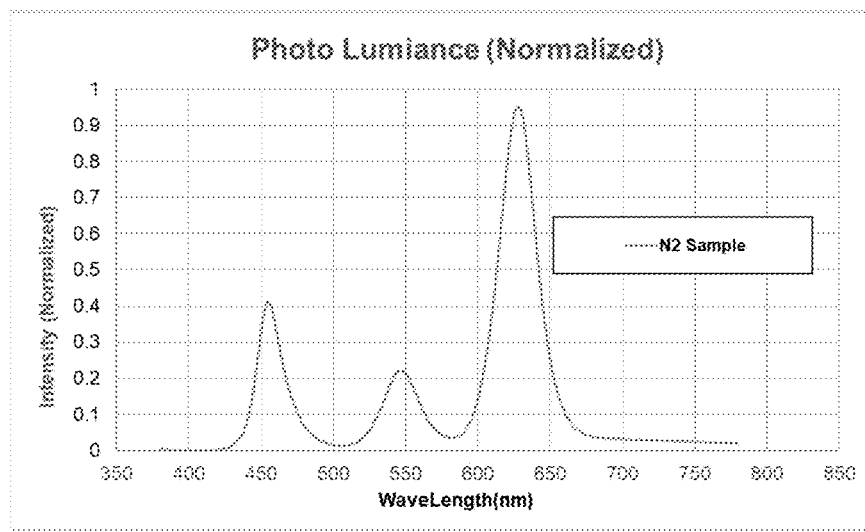
FIG. 5B illustrates the photo-luminance performance of the quantum-dot film in the present invention.

FIGS. 5A to 5B illustrate the photo-luminance performance of the quantum-dot film 200 in the present invention. Table 1 (shown below) illustrates one of the comparisons between quantum-dot film 100 in the prior art (see FIG. 1) and quantum-dot film 200 of the present invention (please see FIG. 2).

to use expensive gas barrier film so as to lower the overall cost as well as expanding the applications of the quantum-dot optical-film material in different fields.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A quantum-dot film, comprising:
a quantum-dot layer, comprising a binder, a plurality of quantum dots, and a plurality of diffusing particles, wherein the plurality of quantum dots and the plurality of diffusing particles are dispersed in the binder with a concentration of the quantum dots in the quantum-dot layer being 0.05-20 wt % and a concentration of the diffusing particles in the quantum-dot layer being 2-40 wt %, wherein the plurality of quantum dots are capable of being water-resistant and oxygen-resistant, and there is no barrier layer disposed over the quantum-dot layer for protecting the plurality of quantum dots from water or oxygen, wherein a coating layer is coated on each of a first major surface and a second major surface of the quantum-dot layer, respectively, each said coating layer comprising a structured surface, wherein the first major surface and the second major surface are two opposite surfaces of the quantum-dot layer.

2. The quantum-dot film according to claim 1, wherein the concentration of the diffusing particles in the quantum-dot layer is 5-15 wt %.

3. The quantum-dot film according to claim 1, wherein the binder comprises PET (polyethylene terephthalate).

4. The quantum-dot film according to claim 2, wherein the diffusing particles comprise an organic material.

5. The quantum-dot film according to claim 1, wherein the concentration of the quantum dots in the quantum-dot layer is 0.05-8 wt %.

6. The quantum-dot film according to claim 1, wherein the thickness of the quantum-dot film is in a range of 25-350 µm.

TABLE 1

|  | Blue Light Intensity | Green Light | | Red Light | | L | x | y |
|---|---|---|---|---|---|---|---|---|
|  |  | Intensity | Wavelength (nm) | Intensity | Wavelength (nm) |  |  |  |
| the quantum-dot film 100 in the prior art (see FIG. 1) | 100.00% | 100.00% | 528 | 100.00% | 626 | 100% | 0.2332 | 0.2065 |
| the quantum-dot film 200 in the present invention (see FIG. 2) | 83.41% | 70.32% | 546 | 118.58% | 628 | 81.21% | 0.271 | 0.1967 |

The present invention has the following advantages: 1. When the PET is stretched and formed, QD particles, which have high thermal stability and surface modification with water and oxygen resistance, are dispersed into the PET to produce a PET quantum-dot optical-film material, achieving the goal of effectively simplifying the production process and thinning. 2. due to the use of surface modification of QD particles with water and oxygen resistance, there is no need 7. The quantum-dot film according to claim 1, wherein the binder is made of PET (polyethylene terephthalate).

8. A quantum-dot film, comprising:
a quantum-dot layer, comprising a binder, a plurality of quantum dots, and a plurality of diffusing particles, wherein the plurality of quantum dots and the plurality of diffusing particles are dispersed in the binder, wherein the plurality of quantum dots are capable of being water-resistant and oxygen-resistant, and there is no barrier layer disposed over the quantum-dot layer for protecting the plurality of quantum dots from water or oxygen, wherein a coating layer is coated on each of a first major surface and a second major surface of the quantum-dot layer, respectively, each said coating layer comprising a structured surface, wherein the first major surface and the second major surface are two opposite surfaces of the quantum-dot layer.

9. The quantum-dot film according to claim 8, wherein the binder comprises PET (polyethylene terephthalate).

10. The quantum-dot film according to claim 8, wherein the binder is made of PET (polyethylene terephthalate).

\* \* \* \* \*